United States Patent
Okada et al.

(10) Patent No.: US 7,648,013 B2
(45) Date of Patent: Jan. 19, 2010

(54) OIL PRESSURE SUPPLY IN AN AUTOMATIC TRANSMISSION

(75) Inventors: Naoya Okada, Anjo (JP); Kutsuhisa Ishii, Okazaki (JP); Mikio Iwase, Anjo (JP); Hirofumi Ota, Toyota (JP); Kazutoshi Nozaki, Aichi-ken (JP); Atsushi Honda, Seto (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 440 days.

(21) Appl. No.: 11/600,093

(22) Filed: Nov. 16, 2006

(65) Prior Publication Data

US 2007/0125615 A1    Jun. 7, 2007

(30) Foreign Application Priority Data

| Nov. 17, 2005 | (JP) | ............................ 2005-333338 |
| Nov. 17, 2005 | (JP) | ............................ 2005-333383 |
| Nov. 17, 2005 | (JP) | ............................ 2005-333385 |
| Nov. 17, 2005 | (JP) | ............................ 2005-333442 |

(51) Int. Cl.
    *F16D 25/12* (2006.01)
(52) U.S. Cl. .................................. 192/87.13; 192/87.11
(58) Field of Classification Search ............... 192/87.13, 192/87.18, 87.11, 12 C; 475/146, 147
    See application file for complete search history.

(56) References Cited

U.S. PATENT DOCUMENTS

| 2,632,544 | A | * | 3/1953 | Hockert .................... 192/87.17 |
| 4,341,296 | A | * | 7/1982 | Schaefer et al. .......... 192/113.5 |
| 5,069,657 | A | * | 12/1991 | Taniguchi et al. ............ 475/283 |
| 5,419,419 | A | * | 5/1995 | Macpherson ............... 192/87.13 |
| 5,704,863 | A | * | 1/1998 | Zalewski et al. ............... 475/88 |
| 5,791,193 | A | * | 8/1998 | Uematsu et al. ............... 74/467 |
| 5,899,461 | A |  | 5/1999 | Yomogita .................... 277/559 |
| 7,232,022 | B2 | * | 6/2007 | Aoki et al. ............... 192/106 F |

FOREIGN PATENT DOCUMENTS

| JP | 02-120573 | 5/1990 |
| JP | 02-125131 | 5/1990 |
| JP | 02-129445 | 5/1990 |
| JP | 05-039866 | 2/1993 |
| JP | 06-137387 | 5/1994 |
| JP | 06-159453 | 6/1994 |
| JP | 08-100844 | 4/1996 |
| JP | 09-210088 | 8/1997 |
| JP | 2002-161973 | 6/2002 |

* cited by examiner

*Primary Examiner*—Rodney H Bonck
*Assistant Examiner*—Justin Holmes
(74) *Attorney, Agent, or Firm*—Bacon & Thomas, PLLC

(57) ABSTRACT

An automatic transmission supplies oil pressure to a hydraulic servo of a second clutch through an oil pressure supply passage extending through a first drum and a second drum, the oil pressure supply passage including a plurality of first oil holes formed in the first drum at equal, circumferential intervals, a plurality of second oil holes formed in the second drum at equal, circumferential intervals, and an annular oil passage formed between the first and second drums and connecting the first oil holes and the second oil holes. The number of first oil holes is different from the number of second oil holes.

3 Claims, 6 Drawing Sheets

|      | C-1 | C-2 | C-3 | C-4 | B-1 | B-2 | F-1 |
|------|-----|-----|-----|-----|-----|-----|-----|
| P    |     |     |     |     |     |     |     |
| REV1 |     |     | ○   |     |     | ○   |     |
| REV2 |     |     |     | ○   |     | ○   |     |
| N    |     |     |     |     |     |     |     |
| 1ST  | ○   |     |     |     |     | (○) | ○   |
| 2ND  | ○   |     |     |     | ○   |     |     |
| 3RD  | ○   |     | ○   |     |     |     |     |
| 4TH  | ○   |     |     | ○   |     |     |     |
| 5TH  | ○   | ○   |     |     |     |     |     |
| 6TH  |     | ○   |     | ○   |     |     |     |
| 7TH  |     | ○   | ○   |     |     |     |     |
| 8TH  |     | ○   |     |     | ○   |     |     |

OIL PRESSURE SUPPLY IN AN AUTOMATIC TRANSMISSION

INCORPORATION BY REFERENCE

The disclosure of Japanese Patent Application No. JP2005-333338 filed on Nov. 17, 2005 including the specification, drawings and abstract is incorporated herein by reference in its entirety.

BACKGROUND OF THE INVENTION

1. Field of the Invention

The present invention relates to oil pressure supply structure in an automatic transmission for supplying oil pressure to a hydraulic servo of a clutch provided in the automatic transmission.

2. Description of the Related Art

A conventional automatic transmission is provided with a plurality of clutches, each clutch including a drum, a piston, a canceller, and so on, as disclosed, for example, in Japanese Patent Application Publication No. JP-A-9-210088 (FIG. 2).

Typically, two or more clutches are provided to achieve a plurality of shift speeds. To make the automatic transmission more compact, the clutches may share components.

In an automatic transmission having a plurality of clutches with shared components, an inner clutch drum is typically splined to an outer clutch drum for rotation integral therewith, and oil pressure is supplied to a hydraulic servo of a clutch housed within the inner drum through oil holes formed in the outside drum and inside drum at equal circumferential intervals.

In the above-described type of automatic transmission, the inner drum is splined to the outer drum at an arbitrary angle during assembly of the automatic transmission. In assembly, variations will occur in the length of the supply path for supplying oil pressure to the hydraulic servo of the clutch housed in the inner drum through first and second oil holes due to differences in their relative angular orientation, and as a result of this variation, differences occur in the time required to supply the oil pressure to the hydraulic servo, leading to variation in the clutch engagement time as between different individual transmissions. In a transmission provided with four circumferentially spaced first oil holes 65 and four circumferentially spaced second oil holes 66, as shown in FIG. 10A, the maximum angular spacing (phase shift) between the first oil holes 65 and second oil holes 66 will be 45 degrees, and hence the length of the supply path for supplying oil pressure to the hydraulic servo will be greater than that of a case in which the angular orientations (phases) of the first oil holes 65 and second oil holes 66 are the same (0 phase shift), leading to a delay in the clutch engagement time. Likewise, where the first oil holes 65 and the second oil holes 66 are each 6 in number the maximum angular spacing will be 30° as shown in FIG. 10B.

To eliminate this variation in the clutch engagement time, the second oil holes 66 may be positioned in alignment with the first oil holes 65 when matching the inner drum within the outer drum, but such positioning requires marking the drums thereby adding a troublesome task to the assembly process and leading to an increase in cost.

SUMMARY OF THE INVENTION

Accordingly, the present invention has as its object provision of an oil pressure supply structure in an automatic transmission by which the angular spacing (phase shift) between first and second oil holes, when a second drum is attached to a first drum, can be minimized without needlessly increasing the number of oil holes.

The oil pressure supply structure according to a first aspect of the present invention is an oil pressure supply passage including a plurality of first oil holes formed in the first drum at equiangular, circumferentially spaced intervals, a plurality of second oil holes formed in the second drum at equiangular, circumferentially spaced intervals, and an annular oil passage formed between a pair of sealing rings disposed between the cylindrical surfaces of the first and second drums. The annular oil passage connects the first oil holes and the second oil holes to each other, and one of the plurality of first oil holes and the plurality of second oil holes is larger in number than the other. Thus, the angular spacing (shift) between the first and second oil holes when the second drum is attached to the first drum will be less than that in the case in which the first and second oil holes are equal in number, and variation in the length of the oil supply path to a clutch, due to an angular (phase) shift during assembly, can be reduced.

In a second aspect of the present invention, the oil pressure supply structure has the first and second oil holes formed in pluralities and in different numbers, excluding a multiple. Thus, the angular spacing between the first and second oil holes arbitrarily set when the first drum and second drum are assembled (splined) together can be effectively reduced.

In the oil pressure supply structure according to a third aspect of the present invention either the first or second oil holes are four in number, and the other of the first and second oil holes are six in number. Thus, angular spacing between the first and second oil holes can be reduced to a sufficiently small value of 15 degrees or less without drilling more than the necessary number of holes.

When the first and second drums are splined together, the second drum is mounted coaxially within the first drum and the first oil holes and the second oil holes are arranged in respective concentric circles.

DETAILED DESCRIPTION OF THE PREFERRED EMBODIMENTS

Figures 1, 2:
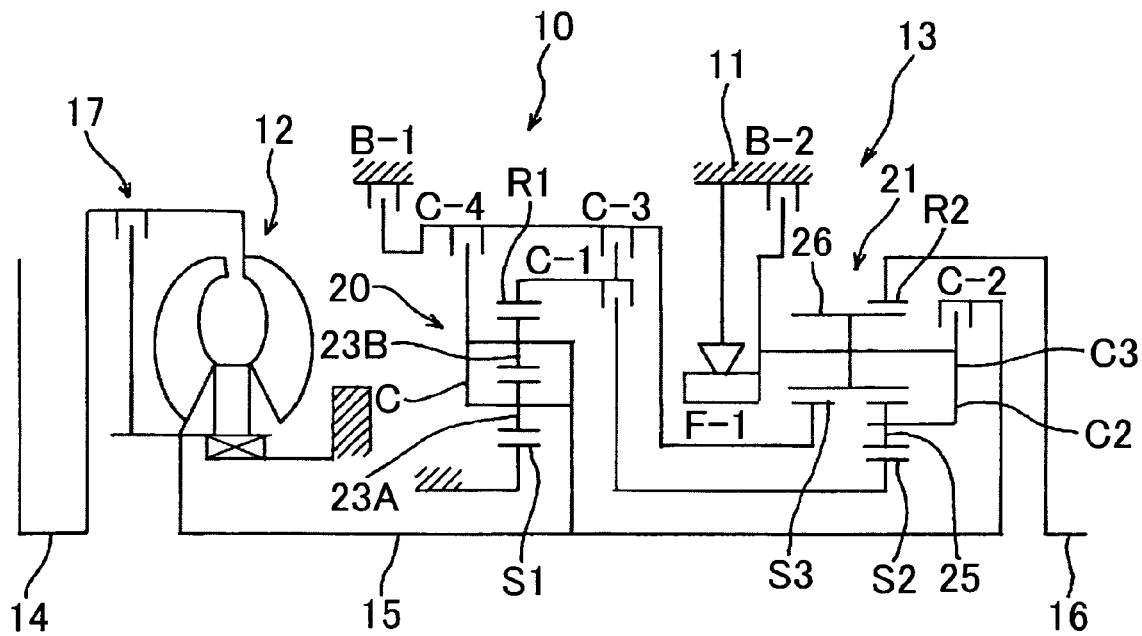
FIG. 1 is a skeletal diagram of an automatic transmission according to the present invention.
FIG. 2 is a table of the states of engagement of brakes and clutches in each gear speed of the automatic transmission in FIG. 1.

An embodiment of the present invention will be described below with reference to the drawings. FIG. 1 shows an automatic transmission 10 which is suitable for use in a front wheel or rear wheel drive type vehicle. The automatic transmission 10 is provided with a torque converter 12 and a speed change mechanism 13, both mounted in a transmission case 11 attached to a vehicle body. Output from the engine is input to an input shaft 15 of the automatic transmission 10 via the pump impeller and the turbine of the torque converter 12. The speed change mechanism 13 changes the speed of rotation input from the input shaft 15 and outputs the rotation at an output shaft 16 connected to a driven wheel. The torque converter 12 is provided with a lock-up clutch 17. Further, the input shaft 15 and output shaft 16 of the automatic transmission 10 are coaxial and aligned front to back of the vehicle. The torque converter 12 is disposed on the front end side of the transmission, while the output shaft 16 is disposed on the rear end side of the vehicle transmission. In the description which follows, the torque converter 12 end of the automatic transmission 10 will be referred to as the "front", and the output shaft 16 end will be referred to as the "rear".

The speed change mechanism 13 is formed of the input shaft 15, a speed reducing planetary gear set 20, planetary gearing 21 including a plurality of planetary gears subsets, the output shaft 16, first through fourth clutches C-1 to C-4, and first and second brakes B-1, B-2, which are supported in series coaxially within the transmission case 11.

The speed reducing planetary gear set 20, which reduces the rotational speed of the input shaft 15 and transfers the rotation to a reduced speed rotary member, includes a sun gear S1 which is fixed to the transmission case 11 and thereby rotationally restricted, a carrier C1 which is directly coupled to the input shaft 15, a first pinion 23A which is supported by the carrier C1 and which meshes with the sun gear S1, a second pinion 23B which is supported by the carrier C1 and meshes with the first pinion 23A, and a ring gear R1 which meshes with the second pinion 23B.

The planetary gear set 21 is a Ravigneaux type gear set combining a single pinion planetary gear set and a double pinion planetary gear set, for example.

A small diameter first sun gear S2 of the planetary gear set 21 is selectively connected to the ring gear R1 of the speed reducing planetary gear set 20 by the first clutch C-1. A large diameter second sun gear S3 is selectively connected to the ring gear R1 of the speed reducing planetary gear set 20 by the third clutch C-3, and selectively connected to the input shaft 15 via the carrier C1 of the speed reducing planetary gear set 20 by the fourth clutch C-4. A short pinion 25 meshes with the first sun gear S2 and a long pinion 26 meshes with the second sun gear S3 and the short pinion 25. The short pinion 25 and long pinion 26 are each rotatably supported by directly coupled carriers C2, C3. A ring gear R2 meshes with the long pinion 26 and is connected to the output shaft 16 serving as an output element.

The second sun gear S3 is selectively connected to the transmission case 11 by the first brake B-1. The carrier C2 (C3) is selectively connected to the input shaft 15 by the second clutch C-2. The carrier C2 (C3) is also selectively connected to the transmission case 11 by the second brake B-2, and can be rotationally restricted by engagement of a one-way clutch F-1.

The automatic transmission 10 as described above is capable of establishing gear ratios for eight forward speeds and two reverse speeds by selectively engaging and disengaging the first through fourth clutches C-1 to C-4 and the first and second brakes B-1, B-2, for selectively connecting or fixing the input shaft 15, the output shaft 16, and the various elements of the speed reducing planetary gear set 20 and planetary gear set 21. In FIG. 2, the circles in the clutch and brake columns indicate that the clutch or brake is in an engaged state, and absence of a circle indicates a disengaged state.

Operation in each gear speed will now be described. When in P (parking) or N (neutral), all of the clutches C-1 to C-4 and brakes B-1, B-2 are released, and therefore there is no power transfer between the input shaft 15 and output shaft 16.

In the first forward speed, as shown in FIG. 2, the first clutch C-1 is engaged and the one-way clutch F-1 is engaged so that the reduced speed of rotation of the ring gear R1, in the speed reducing planetary gear set 20, is input into the first sun gear S2 of the planetary gear set 21 via the first clutch C-1. The reduced speed of rotation of the first sun gear S2 is then further reduced by the carrier C2 (C3), the rotation of which is restricted to a single direction by the one-way clutch F-1, and input into the ring gear R2, whereby the output shaft 16 is positively rotated at a reduced speed, i.e. a first speed gear ratio. Note that during engine braking, the second brake B-2 is engaged instead of the one-way clutch F-1 and the carrier C2 (C3) is held stationary.

In the second forward speed, the first clutch C-1 and the first brake B-1 are engaged. As a result, the reduced speed rotation of the ring gear R1 in the speed reducing planetary gear set 20 is input into the first sun gear S2 via the first clutch C-1, and since the second sun gear S3 is fixed by the first brake B-1, the ring gear R2 is positively rotated at a reduced speed for output of the second speed at the output shaft 16.

In the third forward speed, the first and third clutches C-1, C-3 are engaged. As a result, the reduced speed of rotation of the ring gear R1 in the speed reducing planetary gear set 20 is input into the first sun gear S2 via the first clutch C-1 and input into the second sun gear S3 via the third clutch C-3. Accordingly, the planetary gear set 21 rotates integrally, and the ring gear R2 is positively rotated at a reduced speed, relative to the speed of rotation of the input shaft 15, by the speed reducing planetary gear set 20, for output of the third speed at the output shaft 16.

In the fourth forward speed, the first and fourth clutches C-1, C-4 are engaged. As a result, the reduced speed rotation of the ring gear R1 in the speed reducing planetary gear set 20 is input to the first sun gear S2 via the first clutch C-1, and the rotation of the carrier C1 in the speed reducing planetary gear set 20 is input to the second sun gear S3 via the fourth clutch C-4. Thus, the ring gear R2 is positively rotated for output of fourth speed at the output shaft 16.

In the fifth forward speed, the first and second clutches C-1, C-2 are engaged. As a result, the reduced speed of rotation of the ring gear R1 is input to the first sun gear S2 via the first clutch C-1, and the rotation of the input shaft 15 is input into the carriers C2, C3, which are directly coupled via the second clutch C-2. Thus, the ring gear R2 is positively rotated at a reduced speed for output of the fifth speed at the output shaft 16.

In the sixth forward speed, the second and fourth clutches C-2, C-4 are engaged. As a result, the rotation of the input shaft 15 is input to the second sun gear S3 via the fourth clutch C-4 and the carrier C1 of the speed reducing planetary gear set 20. The rotation of the input shaft 15 is also input into the carriers C2, C3, which are directly coupled via the second clutch C-2. Thus, the planetary gear set 21 rotates integrally with the input shaft 15, and the ring gear R2 is positively rotated for output of sixth speed at the output shaft 16.

In the seventh forward speed, the second and third clutches C-2, C-3 are engaged, whereby the rotation of the input shaft 15 is input to the carriers C2, C3, which are directly coupled via the second clutch C-2, and the reduced speed rotation of the ring gear R1 is input to the second sun gear S3 via -the third clutch C-3. Thus, the ring gear R2 is positively rotated at an increased speed for output of seventh speed at the output shaft 16.

In the eighth forward speed, the second clutch C-2 and the first brake B-1 are engaged for input of the rotation of the input shaft 15 into the carriers C2, C3, which are directly coupled via the second clutch C-2. Further, the second sun gear S3 is fixed by the first brake B-1. Thus, the ring gear R2 is positively rotated at an increased speed for output of eighth speed at the output shaft 16.

In the first reverse speed, the third clutch C-3 and the second brake B-2 are engaged so that the rotation of the input shaft 15 is input into the second sun gear S3 via the third clutch C-3, and the directly coupled carriers C2, C3 are fixed by the second brake B-2. Thus, the ring gear R2 is rotated in reverse at a reduced speed for output of first reverse speed at the output shaft 16.

In the second reverse speed, the fourth clutch C-4 and the second brake B-2 are engaged. As a result, the rotation of the input shaft 15 is input into the second sun gear S3 via the carrier C1, while the directly coupled carriers C2, C3 are fixed by the second brake B-2. Thus, the ring gear R2 is rotated in reverse at a reduced speed for output of second reverse speed at the output shaft 16.

Figure 3:
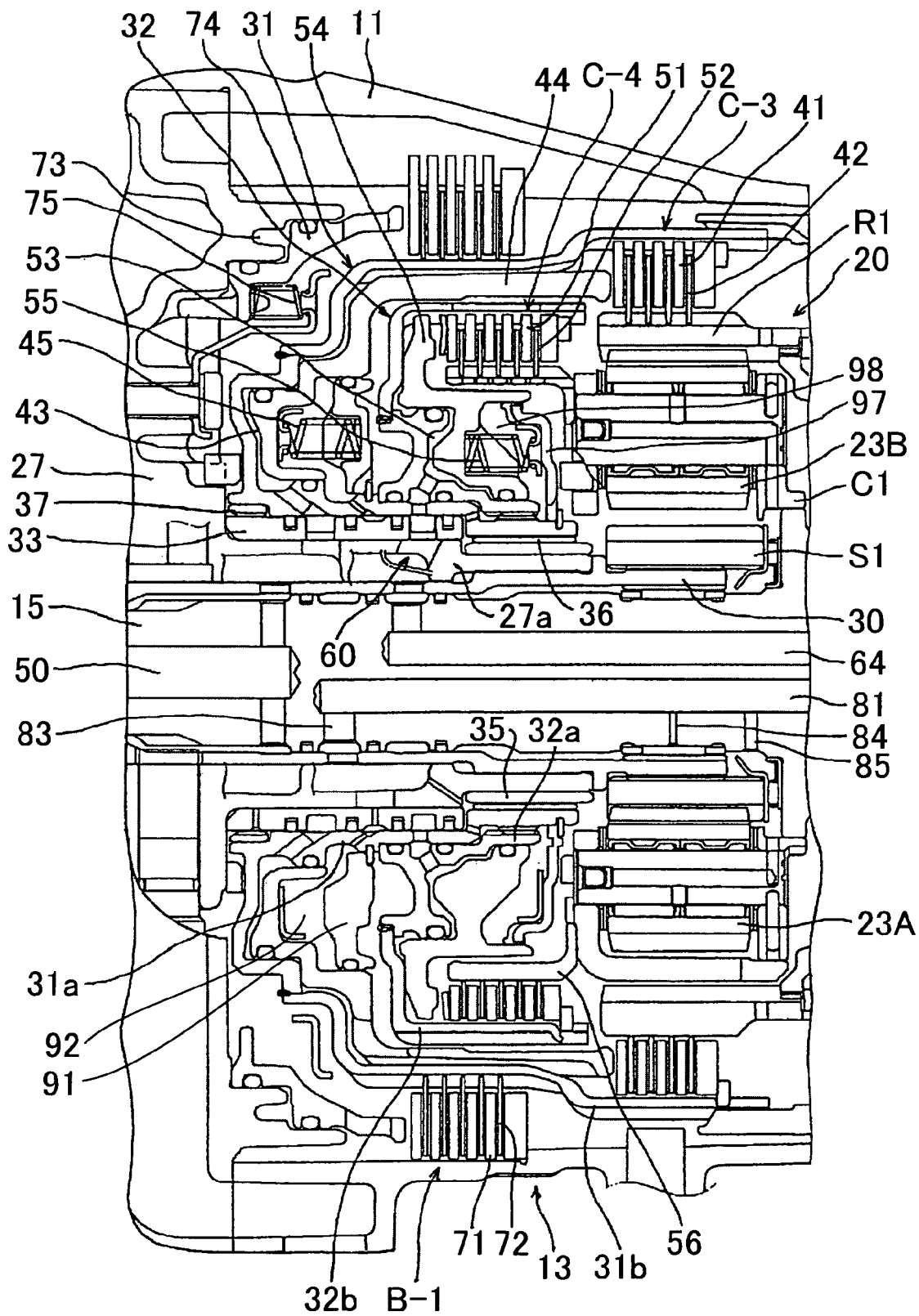
FIG. 3 is a sectional, elevational view of an automatic transmission according to an embodiment of the present invention showing the oil pressure supply structure.
Figure 4:
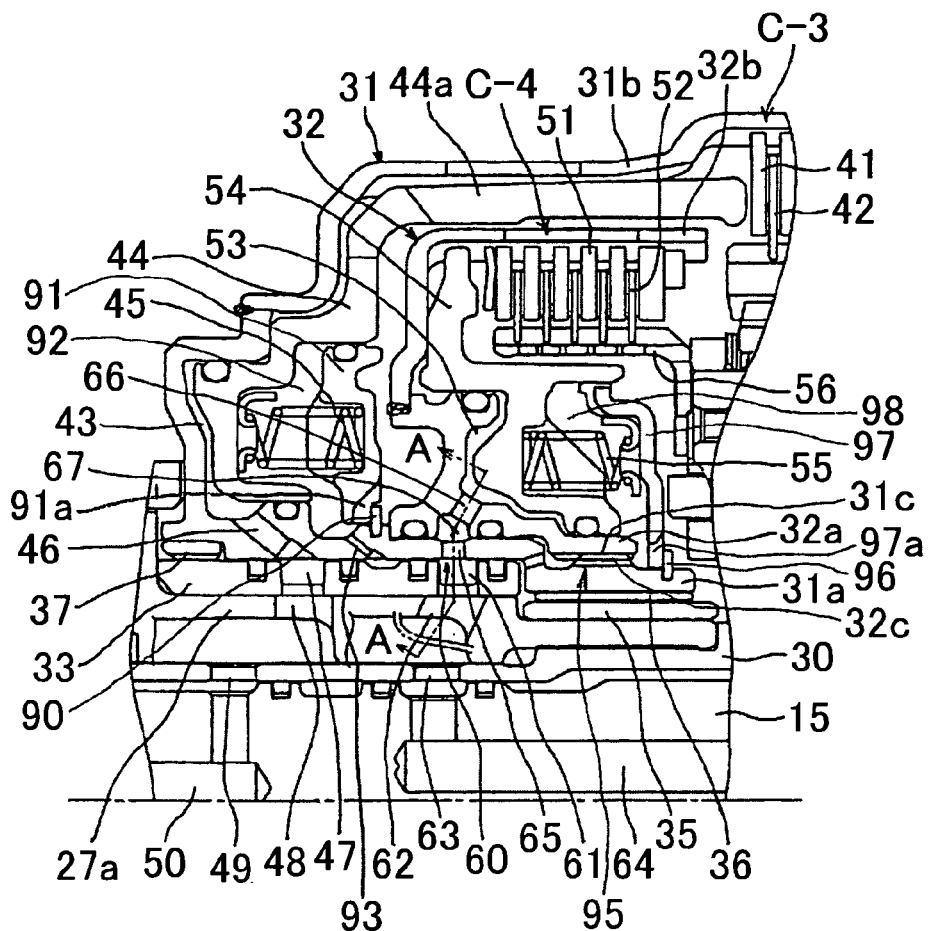
FIG. 4 is a partial enlargement of FIG. 3.

FIGS. 3 and 4 more specifically show the structure of the speed reducing planetary gear set 20, the third and fourth clutches C-3, C-4, and the first brake B-1. As shown in FIGS. 3 and 4, the input shaft 15 is rotatably supported by the transmission case 11, an oil pump body 27 fixed to the transmission case 11 and a stator shaft 30. The stator shaft 30 is press-fit into the interior of a boss portion 27a of the oil pump body 27. The speed reducing planetary gear set 20 is disposed on the outer surface of a rear side end portion of the stator shaft 30, and the sun gear S1 of the speed reducing planetary gear set 20 is held against rotation by spline engagement.

The third clutch C-3 has a first drum 31 of a closed-end cylindrical shape, and the fourth clutch C-4 has a second drum 32 also having a closed-end cylindrical shape, both housed in the transmission case 11. The fourth clutch C-4 is accommodated within the interior of the first drum 31. The first drum 31 is rotatably supported on the outer surface of a sleeve member 33 which is press-fit over the outer periphery of the boss portion 27a of the oil pump body 27. The second drum 32 is supported by a boss 31a and extends coaxially within the first drum 31. Further, the second drum 32 is engaged with the first drum 31 by splined portion 95, for rotation integral therewith.

A plurality of sealing members are interposed between the inner cylindrical surface of the boss portion 31a of the first drum 31 and the outer cylindrical surface of the sleeve member 33. The rear end of the boss portion 31a is rotatably supported by a main bearing 36, which is disposed on a fixing sleeve 35 fitted onto the outer surface of the rear end portion of the boss portion 27a of the oil pump body 27. The main bearing 36 has a sufficient axial length so that it alone rotatably supports the first drum 31.

An auxiliary bearing 37 having a shorter axial length than that of the main bearing 36, is press-fit within the interior of the front side end of the boss portion 31a. The auxiliary bearing 37 surrounds the outer surface of the sleeve member 33 with a gap therebetween, and does not function as a bearing in normal operation. The auxiliary bearing 37 contacts the outer periphery of the sleeve member 33 to function as a bearing only when the first drum 31 inclines relative to the central axis of the transmission at or beyond a predetermined angle.

The open end (end portion) 31b of the first drum 31 is selectively connected to the ring gear R1 of the speed reducing planetary gear set 20 via the third clutch C-3. The third clutch C-3 is formed of friction engagement elements including separator plates 41 which are splined to the inner cylindrical surface of end portion 31b and friction plates 42 which are splined to the ring gear R1, and a first hydraulic servo. The first hydraulic servo includes a first piston 44, which is slidably mounted within a first cylinder chamber 43 formed in the bottom portion of the first drum 31, a canceller plate 91 disposed on the boss 31a of the first drum 31, and a return spring 45 which biases the first piston 44 toward the bottom portion of the first drum 31.

An inner peripheral edge of the canceller plate 91 is latched around the outer periphery of the boss 31a of the first drum 31, i.e. movement in one axial direction is limited by a snap ring 90. The outer peripheral edge of the canceller plate 91 slidably engages the inner cylindrical surface of the first piston 44 with a liquid-tight seal therebetween, and a first cancel chamber 92 is formed between the canceller plate 91 and the first piston 44. The return spring 45, which urges the first piston 44 in the axial direction which disengages the third clutch C-3, is disposed between the canceller plate 91 and first piston 44.

The first cancel chamber 92 is supplied with cancel oil (operating fluid) through a cancel oil supply hole 93 extending through the radial dimension of the boss 27a of the oil pump body 27, the sleeve member 33, and the first drum 31. The cancel oil supplied to the first cancel chamber 92 is discharged through a cancel oil discharge groove 91a formed in the inner peripheral edge of the canceller plate 91. The first cancel chamber 92 acts to cancel centrifugal oil pressure generated in the first cylinder chamber 43.

The first piston 44 is coaxial with the first drum 31 and includes a skirt which extends along the inner cylindrical surface of cylindrical portion 31b of the first drum 31, and the open end (edge) of the skirt engages friction engagement elements of the third clutch C-3. The first cylinder chamber 43 of the hydraulic servo is defined between the bottom wall of the first drum 31 and the first piston 44. The first cylindrical chamber 43 communicates with an oil passage formed in the boss portion 27a of the oil pump body 27 via a supply passage 47 formed by oil holes in the boss portion 31a of the first drum 31 and the sleeve member 33. The oil passage formed in the boss portion 27a is connected to an oil pressure control device, not shown in the drawings, and as a result of oil pressure supplied by the oil pressure control device, the first piston 44 moves against the spring force of the return spring 45 so as to engage the third clutch C-3. When the supply of oil pressure is stopped, the third clutch C-3 is released by the spring force of the return spring 45.

The second drum 32 is disposed radially inward of both the first piston 44 and the third clutch C-3. The second drum 32 includes an inner boss portion 32a disposed coaxially within the boss 31a of the first drum 31, and an outer cylindrical portion 32b. As shown in FIG. 4, splines 32c are formed on the inner surface of a rear side end portion of the boss 32a of the second drum 32. The splines 32c are engaged with splines 31c formed on the outer surface of a rear side end portion of the boss 31 a of the first drum 31 to form the spline engagement section 95.

The open side (rear side) end portion of the outer cylindrical portion 32b of the second drum 32 is selectively engaged with the carrier C1 of the speed reducing planetary gear set 20 via the fourth clutch C-4. The fourth clutch C-4 includes separator plates 51 which are splined to the inner surface of the outer cylindrical portion 32b and friction plates 52 which are splined to the outer surface of a clutch hub 56 coupled to the carrier C1. The fourth clutch C-4 is operated by a second hydraulic servo which includes a second piston 54, slidably mounted within a second cylinder chamber 53 formed in the bottom portion of the second drum 32, a canceller plate 97 disposed on the boss 31a of the first drum 31, and a return spring 55 which biases the second piston 54 forward for disengagement of the clutch C-4. A distal end of a radially outward engaging portion of the second piston 54 is splined to the interior surface of the outer cylindrical portion 32b of the second drum 32 and is axially spaced to the front of the fourth clutch C-3. The second piston 54 is supported on the outer surface of the boss portion 32a of the second drum 32.

The canceller plate 97 is disposed on the rear side end of the boss portion 31a of the first drum 31 with movement thereof in one axial direction limited by a snap ring 96. The radially outer edge of the canceller plate 97 is fitted within a skirt portion of the second piston 54 to form a second cancel chamber 98 between the canceller plate 97 and the second piston 54. The return spring 55, which urges the second piston 54 in the axial direction disengaging the fourth clutch C-4, is disposed between the canceller plate 97 and the second piston 54.

As shown in FIG. 4, the second cylinder chamber 53 of the hydraulic servo is connected to an oil pressure control device, not shown in the drawings, via an oil pressure supply passage 60 formed between the respective boss portions 31a, 32a of the first and second drums 31, 32, and oil hole passages 61 and 62 formed respectively in the sleeve member 33 and the boss portion 27a of the oil pump body 27.

Figure 5:
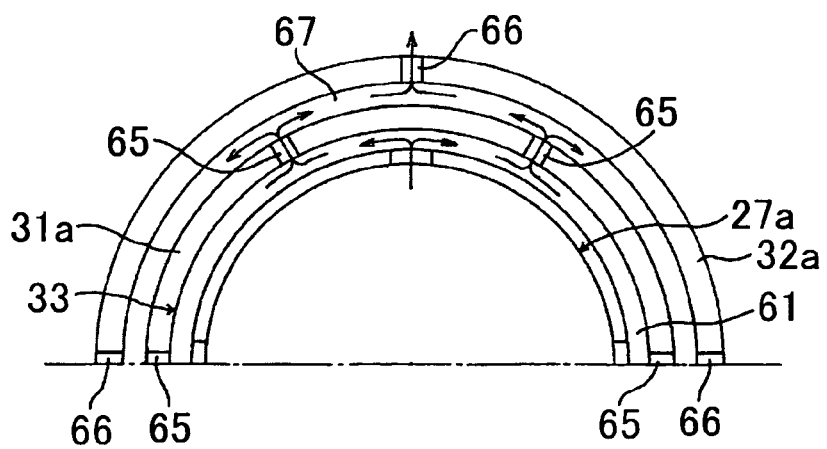
FIG. 5 is a sectional view taken along line A-A in FIG. 4.

As shown in FIG. 5, the pressure oil supply passage 60 is constituted by a plurality of first oil holes 65 radially formed in the boss 31a of the first drum 31 at equal circumferentially spaced intervals, a plurality of second oil holes 66 radially formed in the boss 32a of the second drum 32 at equal circumferentially spaced intervals, and an annular oil passage 67 formed between the two boss portions 31a, 32a and between an axially spaced pair of sealing rings. The first and second oil holes 65, 66 communicate with each other via the annular oil passage 67.

The outer surface of the outer cylindrical portion 31b of the first drum 31 is selectively connected to the transmission case 11 via the first brake B-1. The first brake B-1 is formed of friction engagement elements including separator plates 71 which are spline-engaged with the inner surface of the transmission case 11 and friction plates 72 which are spline-engaged with the outer surface of the outer cylindrical portion 31b of the first drum 31. The first brake B-1 is operated by a hydraulic servo formed of a piston 74, slidably mounted in a cylinder chamber 73 formed in the transmission case 11, and a return spring 75 which axially biases the piston 74 toward a position where the first brake B-1 is disengaged.

The free end of a skirt portion of the piston 74 is positioned to engage (axially aligned with) the friction engagement elements of the first brake B-1. The cylinder chamber 73 of the hydraulic servo is connected to the oil pressure control device via an oil passage or the like, not shown in the drawing, formed in the transmission case 11 and, responsive to oil pressure supplied from the oil pressure control device, the piston 74 slides against the spring force of the return spring 75 so as to engage the first brake B-1. When the supply of oil pressure is stopped, the brake B-1 is released by the spring force of the return spring 75.

As shown in FIG. 3, a lubricating supply passage 81 receives lubricating oil supplied by an oil pump via the oil pressure control device and a supply hole 83. A plurality of rows of supply holes 84, 85 communicate with the supply passage 81, and the lubricating oil is supplied to each of the various portions of the interior of the transmission case 11 through these supply holes 84, 85. The lubricating oil supplied to the interior of the transmission case 11 is dispersed radially outward by centrifugal force, and thereby supplied to various locations where it is needed for lubrication, including the speed reducing planetary gear set 20, the clutches C-3, C-4, the brake B-1, and the bearings.

Figure 6:
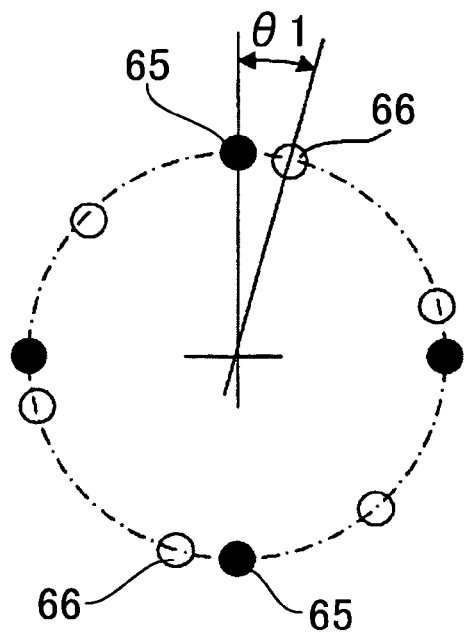
FIG. 6 is a diagram showing the relationship between the first oil holes and second oil holes shown in FIG. 5.

FIG. 6 shows the angular (phase) relationship between the circumferential positions of the plurality of first oil holes 65 formed in the boss 31a of the first drum 31 and the circumferential positions of the plurality of second oil holes 66 formed in the boss 32a of the second drum 32. To facilitate understanding, the first oil holes 65 are depicted as white circles and the second oil holes 66 are depicted as black circles. In the drawing, six first oil holes 65 are formed at circumferentially spaced, equal intervals, and four second oil holes 66 are formed at circumferentially spaced, equal intervals.

During attachment of the second drum 32, the second drum 32 is spline-engaged to the first drum 31 at an arbitrary angular relationship (arbitrary angular phase), but due to the combination of six first oil holes 65 and four second oil holes 66, the angular offset (phase shift) $\theta1$ between the oil holes 65, 66 is 15 degrees or less in at least two circumferential locations, even in the worst case scenario.

As a result, working oil is distributed to the six circumferential first oil holes 65 from the oil pressure control device, not shown in the drawing, through the supply hole 63 formed in the input shaft 15, the oil passage 62 formed in the boss 27a of the oil pump body 27, and the annular oil passage 61 formed in the sleeve member 33. The working oil that is introduced through the first oil holes 65 is distributed to the four circumferential second oil holes 66 via the annular oil passage 67 formed at the inner surface of the second drum 32, and then supplied to the second cylinder chamber 53 of the second hydraulic servo.

The working oil that passes through the first oil holes 65 is able to reach the second oil holes 66 by flowing a maximum of $\theta1$ (15 degrees) through the annular oil passage 67 in a circumferential direction, and hence variation in the length of the oil supply path can be reduced.

Thus, the angular distance (spacing) (phase shift) between the first and second oil holes 65, 66 resulting from splining the second drum 32 to the first drum 31 can be minimized, and as a result, variation in the length of the oil supply path to the second cylinder chamber 53 of the hydraulic servo in the fourth clutch C-4 due to angular differences can be reduced. Moreover, variation in the lag time in engagement of the frictional engagement member (response time) can also be reduced.

By ensuring that the angular orientation of the first and second oil holes 65, 66 matches in at least two circumferential locations such that oil can be supplied to the second cylinder chamber 53 of the hydraulic servo through the first and second oil holes 65, 66 at those two matching locations, problems such as response delay of the hydraulic servo do not occur. In other words, no particular problems arise if the angular distance between the first and second oil holes 65, 66 is significantly larger at circumferential locations other than those two matching locations.

Figure 10A:
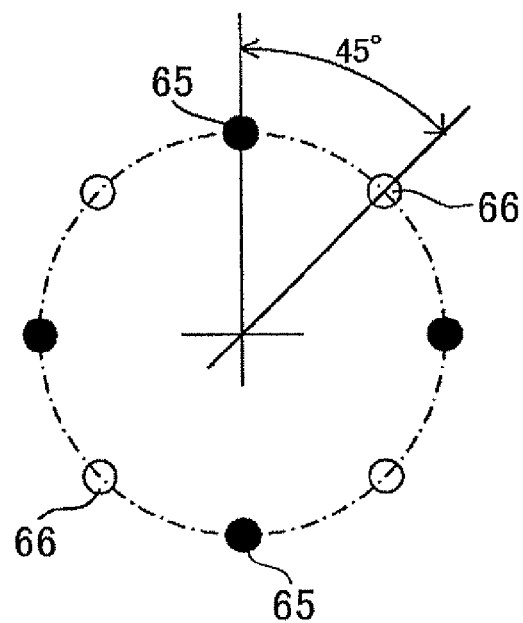
FIGS. 10A and 10B are diagrams showing relationships between first oil holes and second oil holes in the related art.
Figure 10B:
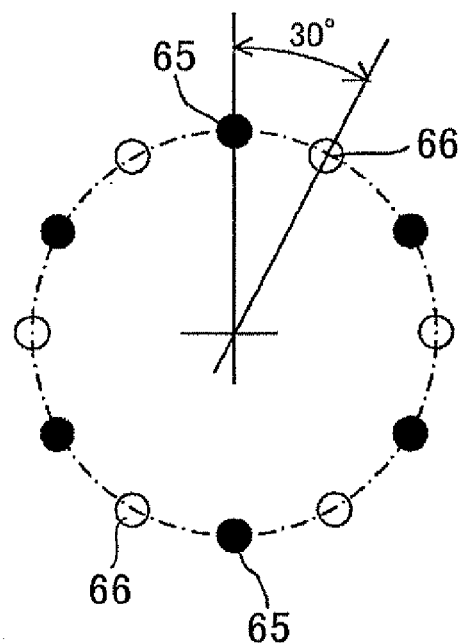

As a comparative example, FIG. 10 shows a case (A) in which four first oil holes 65 and four second oil holes 66 are provided, and a case (B) in which six of each of the oil holes 65, 66 are provided. When four of each are provided, the maximum angular distance (phase shift) is 45 degrees, and when six of each are provided, the maximum angular distance is 30 degrees. Hence, variation in the length of the oil supply path increases as a result of the arbitrary positioning of the two drums during attachment, leading to variation in the lag time for engagement of the frictional engagement element.

Comparing case (A) with case (B) in FIG. 10, the maximum angular distance is smaller in case (B) where six first oil holes 65 and six second oil holes 66 are provided. Thus, by increasing the number of first and second oil holes 65, 66, the angular spacing can be reduced. However, increasing the number of oil holes leads to an increase in processing costs. Moreover, as the number of oil holes drilled increases, the strength of the drum decreases, and the thickness of the drum must be increased to compensate for this decrease in strength, leading to an increase in overall weight. It is therefore desirable to reduce the angular spacing (phase shift) of the first and second oil holes 65, 66 to the extent possible, without increasing the number of oil holes.

Figure 7:
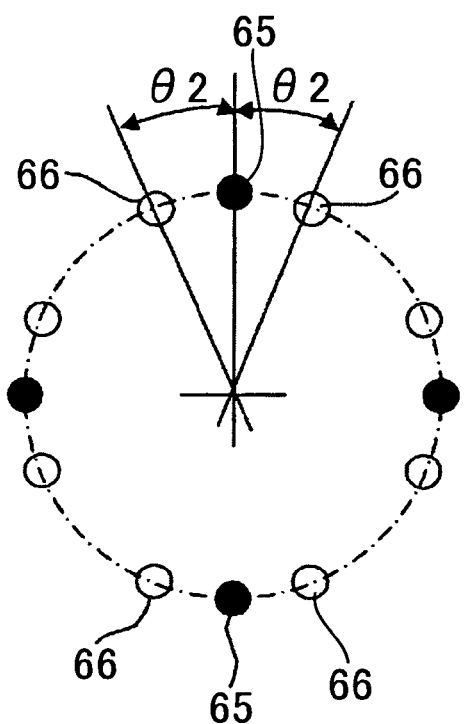
FIG. 7 is a diagram showing the relationship between first oil holes and second oil holes according to another embodiment of the present invention.
Figure 8:
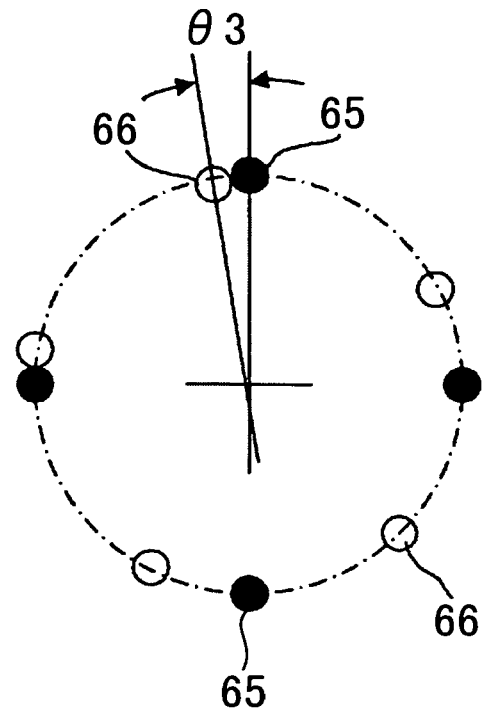
FIG. 8 is a diagram showing the relationship between first oil holes and second oil holes according to yet another embodiment of the present invention.
Figure 9:
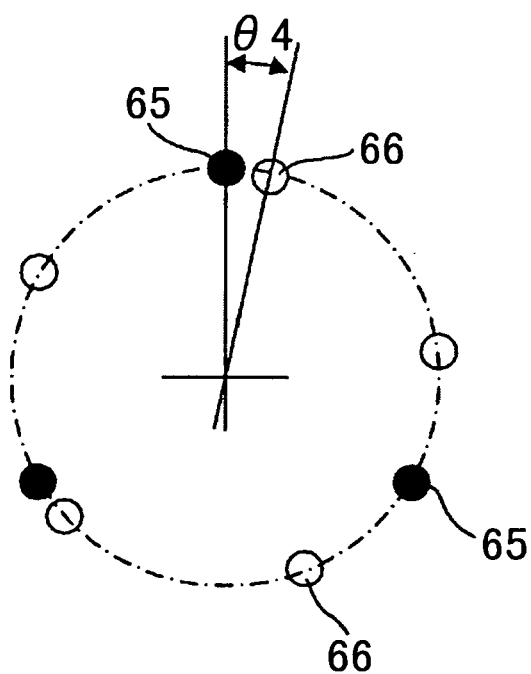
FIG. 9 is a diagram showing the relationship between first oil holes and second oil holes according to a further embodiment of the present invention.

FIGS. 7 to 9 show other embodiments of the present invention, in which the first oil holes 65 and number of second oil holes 66 are provided in various combinations.

In FIG. 7, eight of the first oil holes 65 and four of the second oil holes 66 are combined. In this case, the angular spacing $\theta 2$ between the first and second oil holes 65, 66, resulting from arbitrary relative angular orientation of the two drums in mounting the second drum 32 within the first drum 31, is a maximum of 22.5 degrees in at least two circumferential locations. However, note that in this embodiment (FIG. 7), the number of first oil holes 65 (eight) is a multiple of the number of second oil holes 66 (four), and hence when the angular position of a second oil hole 66 is set intermediate the angular positions of adjacent first oil holes 65, all of the second oil holes 66 become positioned intermediate first oil holes 65. Even though the number of second oil holes is larger in the embodiment of FIG. 7 as compared with FIG. 6, in which four first oil holes 65 and six second oil holes 66 are provided, the effective angular spacing $\theta$ is larger. Therefore, it is preferable that the number of first oil holes 65 and the number of second oil holes 66 do not have a whole number multiple relationship.

In the combination shown in FIG. 8, an odd number of first oil holes 65 and an even number of second oil holes 66 are provided. More specifically, five first oil holes 65 are provided at equiangular, circumferential intervals, and four second oil holes 66 are provided at equiangular, circumferential intervals.

In the combination shown in FIG. 9, an odd number of first oil holes 65 and an odd number of second oil holes 66 are provided. More specifically, three first oil holes 65 are provided at equiangular, circumferential intervals, and five second oil holes 66 are provided at equiangular, circumferential intervals.

In the combinations shown in FIGS. 8 and 9, the oil hole arrangements do not have point symmetry and are circumferentially unbalanced, in contrast to the even numbers of oil holes shown in FIGS. 6 and 7. However, the angular spacings $\theta 3$, $\theta 4$ between the first and second oil holes 65, 66 are also reduced by the embodiments of FIGS. 8 and 9, and hence these arrangements are similarly effective.

In the embodiments described above, when oil pressure is supplied to the hydraulic servo of the fourth clutch C-4 through the first oil holes 65 formed in the first drum 31 and the second oil holes 66 formed in the second drum 32, the first and second oil holes 65, 66 are both plural, different numbers, for example six first oil holes 65 formed at equiangular, circumferential intervals and four second oil holes 66 being formed at equiangular, circumferential intervals, and therefore the angular spacing between the first and second oil holes 65, 66 resulting from arbitrary orientation of the second drum 32 relative to the first drum 31 can be minimized. As a result, variation in the length of the oil supply path to the second cylinder chamber 53 of the hydraulic servo in the fourth clutch C-4, resulting from arbitrary angular orientation in attachment of the two drums can be reduced, and variation in the lag time for engagement of the frictional engagement elements can be reduced, i.e. responsiveness is increased.

Further, variation in the length of the oil supply path to the second cylinder chamber 53 of the hydraulic servo in the fourth clutch C-4 caused by different angular orientations of the first and second oil holes 65, 66, where the first and second oil holes 65, 66 are provided in equal numbers, can be reduced by using a multiple combination such as four and eight, an odd number-even number combination such as five and four, or an odd number-odd number combination such as five and three.

In the embodiments described above, the number of first oil holes 65 is larger than the number of second oil holes 66; however the number of second oil holes 66 may be larger than the number of first oil holes 65.

In the embodiment described above, the automatic transmission provides gear ratios for eight forward speeds and two reverse speeds, but the present invention is not so limited, and may be applied to any automatic transmission in which lubricating oil is supplied via one clutch to another clutch.

Further, while in the embodiment described above the planetary gear set 21 is a Ravigneaux type gear set combining a single pinion planetary gear subset and a double pinion planetary gear subset, the planetary gear set 21 is not limited to a Ravigneaux type gear set, and any planetary gear set may be employed so long as it includes a plurality (two or more) of planetary gear subsets.

Note that the stator shaft 30, oil pump body 27, sleeve member 33, and so on are joined integrally to the transmission case 11. In other words, the stator shaft 30, oil pump body 27, and sleeve member 33 constitute part of the transmission case 11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:
   a speed change mechanism for shifting between a plurality of speeds by engaging and disengaging a plurality of clutches and brakes, in which the speed change mechanism comprises a first hydraulic servo having a first drum and a first piston which forms a first cylinder chamber together with the first drum, and a second hydraulic servo disposed on an outer surface of a boss portion of the first drum, the second hydraulic servo is formed of a second drum which rotates integrally with the first drum and a second piston which forms a second cylinder chamber together with the second drum, and an oil pressure supply passage provided in the first drum and the second drum for supply of oil to the second cylinder chamber, wherein the oil pressure supply passage comprises a plurality of first oil holes extending through a cylindrical wall of the first drum at equiangular, circumferential spaced intervals, a plurality of second oil holes extending through a cylindrical wall of the second drum at equiangular, circumferential spaced intervals, and an annular oil passage formed between a pair of sealing rings disposed between the cylindrical walls of first and second drums, the annular oil passage providing a fluid connection between the first oil holes and the second oil holes, and wherein the plurality of the first oil holes is different in number from the plurality of the second oil holes; and wherein the larger of the number of the plurality of the first oil holes and the number of the plurality of the second oil holes is not a whole number multiple of the smaller of the number of the plurality of the first oil holes and the number of the plurality of the second oil holes.

2. The automatic transmission according to claim 1, wherein either the first or second oil holes are four in number, and the other of the first and second oil holes are six in number.

3. The automatic transmission according to claim 1, wherein the second drum is mounted coaxially within the first drum whereby the first oil holes and the second oil holes are arranged in respective concentric circles.

* * * * *